MAGNETIC CHECKING DEVICES

Filed Dec. 21, 1960

2 Sheets-Sheet 1

INVENTOR
CARL E. RUOFF

BY Francis V. Giolma

ATTORNEY

April 6, 1965 C. E. RUOFF 3,177,468

MAGNETIC CHECKING DEVICES

Filed Dec. 21, 1960 2 Sheets-Sheet 2

3,177,468
Patented Apr. 6, 1965

3,177,468
MAGNETIC CHECKING DEVICES

Carl E. Ruoff, Endicott, N.Y., assignor to International Business Machines Corporation, New York, N.Y., a corporation of New York Filed Dec. 21, 1960, Ser. No. 77,341
5 Claims. (Cl. 340—146.2)

Figure 1:
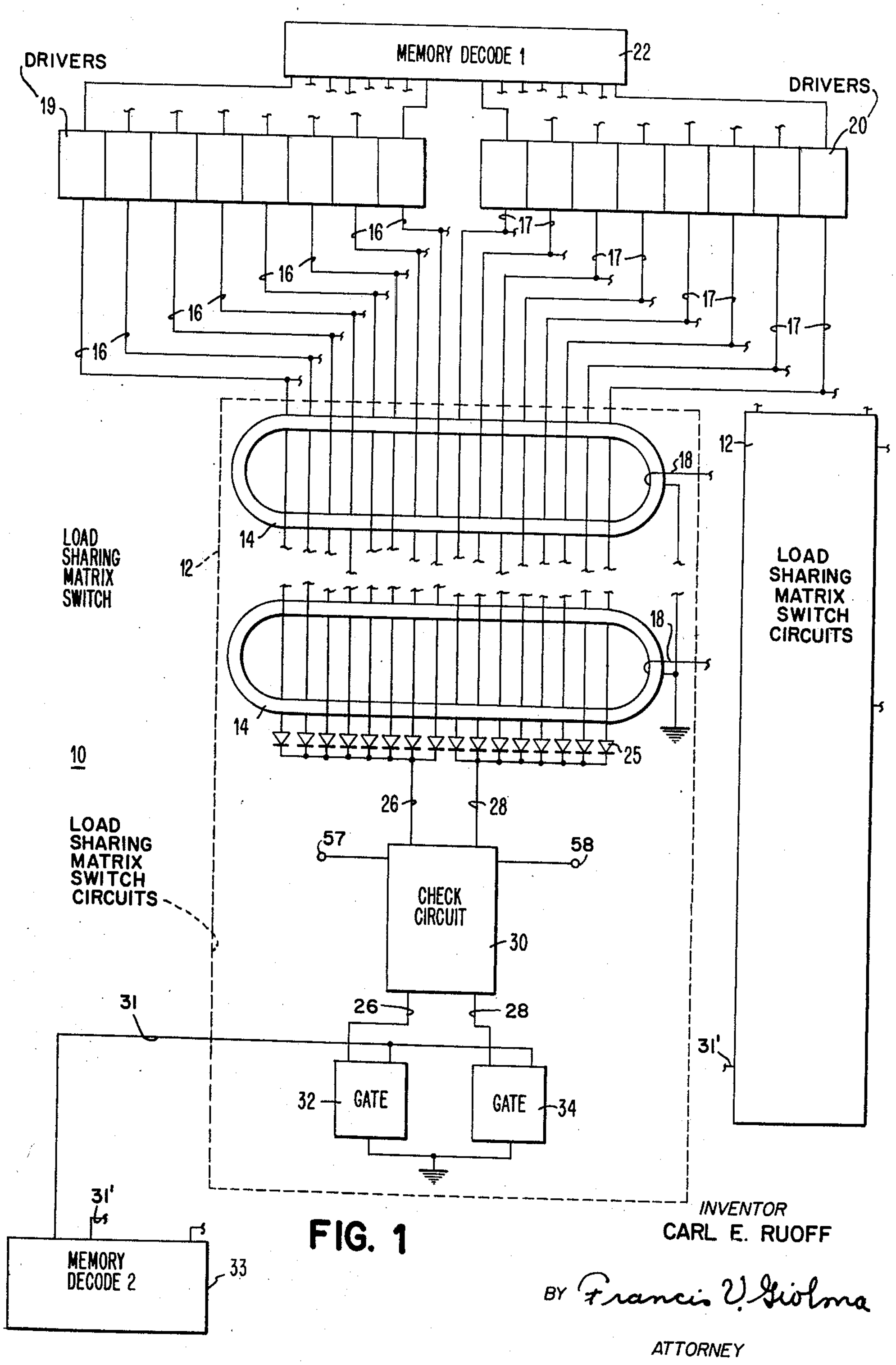

The present invention relates generally to checking devices and it has reference in particular to a checking circuit utilizing magnetic cores.

Generally stated, it is an object of this invention to provide a driver checking circuit that is simple and effective.

More specifically, it is an object of this invention to provide for using magnetic cores in a differential detector for detecting a change in the currents of either of two drive lines which are supposed to maintain a predetermined current relation therebetween.

Another object of this invention is to provide a check circuit wherein two drive lines are each threaded through two cores in opposite senses to provide opposite difference magnetomotive forces on the two magnetic cores which are neutralized by bias windings so that, when the proper current relation in the drive lines exists, read and write windings are selectively effective to switch both cores in predetermined directions at definite read and write times.

It is also an object of the present invention to provide a check circuit for drive lines that provides an output signal only so long as the currents in both lines remain within predetermined limits.

It is an important object of this invention to provide a static check circuit that is inexpensive yet positive in its operation.

Yet another object of this invention is to provide a simple and effective load sharing matrix switch driver checking circuit.

Still another object of this invention is to provide an 8 out of 16 driver check circuit.

The foregoing and other objects, features and advantages of the invention will be apparent from the following more particular description of a preferred embodiment of the invention, as illustrated in the accompanying drawings.

Figure 2:
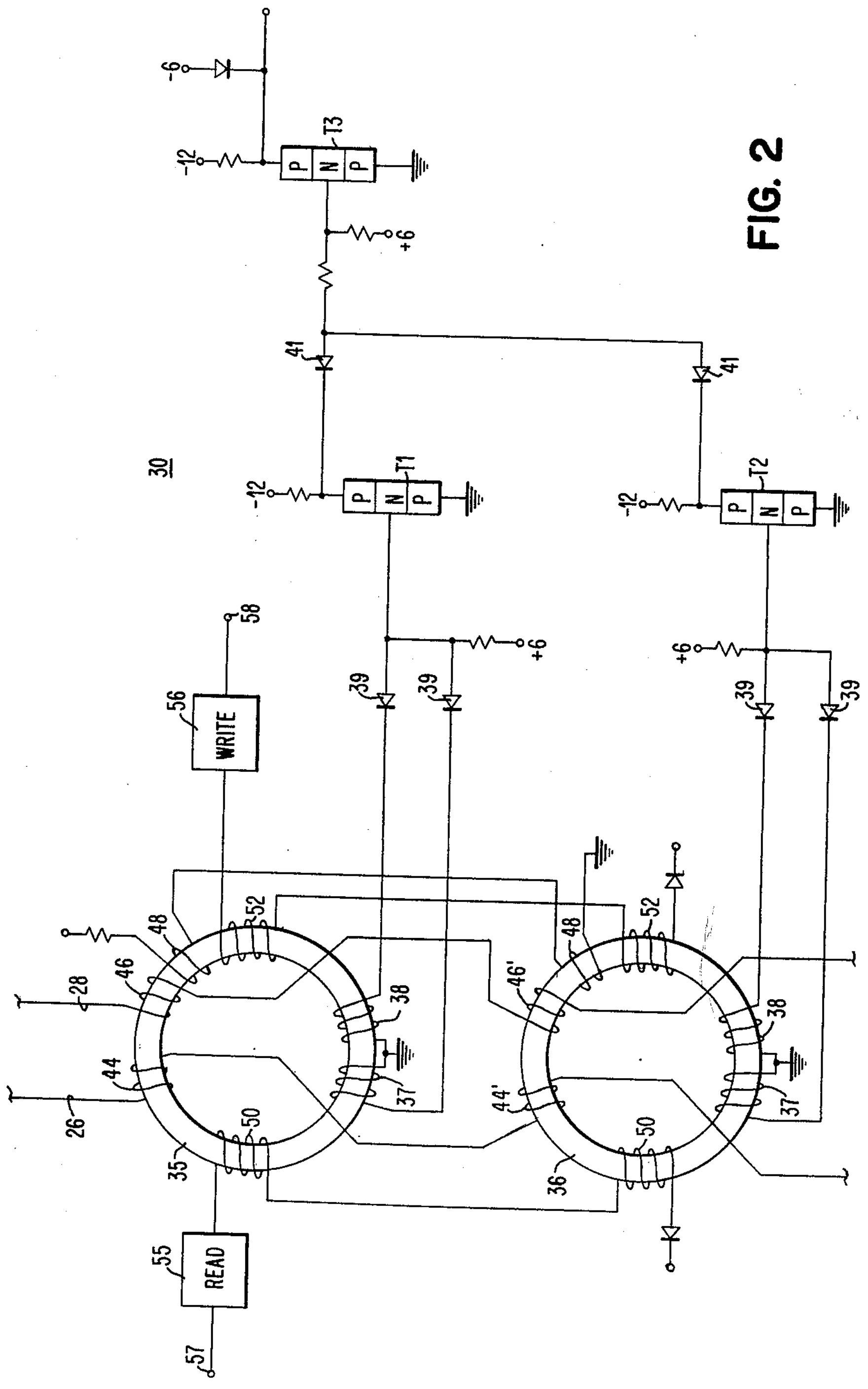

In the drawings:

FIG. 1 is a schematic diagram of a portion of a system showing an application of a check circuit for the drivers of a load sharing matrix switch, and FIG. 2 shows details of the circuitry for the check circuit used in the system of FIG. 1.

In practicing the present invention, a check circuit comprises a pair of cores of magnetic material each provided with oppositely disposed windings connected in circuit with each of two drive lines in which the current is to be checked for a predetermined relationship. The turns of the windings are so arranged that one line provides a differential magnetomotive force in one core and the other line provides a similar differential in the other core. Bias windings on each core neutralize these differentials for a normal value of current in the lines. Oppositely disposed read and write lines are driven by clock signals at the same times as the drive lines are energized to set the cores to the zero state on read and to the one state on write for a valid condition. Output windings on the cores are anded to give an output only when both cores are set in the same sense.

Referring particularly to FIG. 1 of the drawings, the reference number 10 denotes generally a load sharing matrix switch of a well-known type for a core memory (not shown) wherein a plurality of arrays 12 of cores 14 of magnetic material are each provided with a plurality of selection drive lines 16 and 17 (arranged in the present instance in two groups of eight each) which are selectively threaded through the cores of each array in different directions in a particular manner for selecting a particular core in an array 12 depending upon which of the lines in each group are energized. Each core 14 is provided with an output winding 18 which is disposed to be connected to provide the X lines for effecting read and write operations in a core memory (not shown). A similiar arrangement (not shown) provides the Y lines for the memory. A plurality of drivers 19 and 20 are disposed to connect the selected lines 16 and 17 to a source of current under the control of suitable clock controlled signals from Memory Decode 1 logic 22, a selected 4 of each 8 drivers being rendered conductive by such signals in the present instance for a valid selection. The lines 16 and 17 are connected through diodes 25 to drive lines 26 and 28, respectively. The drive lines 26 and 28 are in turn connected to a check circuit 30, which will be described in detail hereinafter, and through switch means such as gates 32 and 34 of any well-known type which are selectively switched by clock controlled signals from Memory Decode 2 logic 33 over conductors 31, 31′, etc. to complete a circuit for the lines 16 and 17 and, hence, select a particular core 14 of one of the arrays 12.

Referring to FIG. 2 of the drawings, it will be seen that each check circuit 30 comprises a pair of cores 35 and 36 of magnetic material, each having a plurality of windings thereon, including oppositely disposed output windings 37 and 38 which are connected at one end to ground and at the other end are connected through blocking diodes 39 to amplifier means such as transistors T1 and T2, respectively. These amplifier transistors are connected through an AND circuit of diodes 41 to an output transistor amplifier T3 for producing an output signal only when both cores 35 and 36 are switched in one direction or the other.

The cores 35 and 36 each have opposing windings 44–46 and 44′–46′, which are so wound in opposite directions, as to provide a differential magnetomotive force for the winding 44 on the core 35, and a similar differential magnetomotive force for winding 46′ on core 36. A bias winding 48 on each of the cores 35 and 36 is disposed to neutralize the differential magnetomotive forces of windings 44 and 46′ for predetermined normal values of currents. Read drive windings 50 are provided on each core in the same sense for setting the cores to the zero state and opposing write windings 52 are provided on the cores for switching the cores back to the one state during write time. This timing may be determined by suitable clock signals applied to the read and write drivers 55 and 56, respectively, at terminals 57 and 58 at the same time that the Memory Decode 1 and Memory Decode 2 logic is triggered by the clock to select predetermined ones of the drive lines 16 and 17 and selectively control the gates 32 and 34.

By arranging the windings 44–46 and 44′–46′ in opposite senses with a predetermined turns ratio and neutralizing the differential magnetomotive forces of the windings 44 and 46′ by means of bias windings 48 for the desired current conditions of lines 26 and 28, any deviation in currents in these lines will result in a differential flux in the cores 35 or 36 that will not be exactly neutralized by the bias windings 48. This means that, depending on the direction of deviation of the currents, one or the other of the cores 35 and 36 will not be switched by the drivers 55 or 56; and, hence, both cores will not be switched to the same condition at read time or write time and no output signal will result, thus indicating either a deviation in one or more of the drivers 18 and 20 or possibly an error in the number of the drivers actually turned on.

In operation, all the cores 35 and 36 in the different check circuits will have been previously set to the one state during the previous write time; and, during read time four of each of the eight, drivers 19 and 20 will be turned on by Memory Decode 1 logic, as will one of the pair of gates 32 and 34 by Memory Decode 2 logic. The driver 55 is simultaneously turned on by the D1 read signal and, if the current in the drivers 19 and 20 are balanced, the currents in the lines 26 and 28 will likewise be balanced and the select pair of cores 35 and 36 will both be switched by the driver 55 to the zero state. At write time D2, both the cores will be switched back to the one state provided the driver conditions are again valid.

In one embodiment of the invention, the two cores used in the check circuit are ferrite cores of approximately 50 mils inside and 80 mils outside diameter, requiring about 500 mil turns to switch. The windings 44 and 46' have four turns each while the windings 46 and 44' have three turns each. The lines 26 and 28 each carry a current of approximately 400 mils, being the sums of the output of four out of each of the eight drivers which supply 100 mils each. The output windings 37 and 38 each have 10 turns, while the bias windings 48 have four turns each. The read windings 50 and write windings 52 have eight turns. The drivers 55 and 56 are 100 mil drivers similar to the drivers 19 and 20.

From the above description and the accompanying drawings, it will be apparent that the present invention provides a simple and effective check circuit which insures that the drive lines of a load sharing matrix switch maintain predetermined current conditions. This arrangement not only checks the output conditions of the individual drivers but also provides a check to insure that 8 out of the 16 drivers are operating for a valid condition. This arrangement provides an inexpensive method of checking, in particular, for an arrangement as described when the currents in a pair of drive lines are supposed to be equal and, in general, for any given ratio of currents in two or more paths by appropriately selecting the turns ratios of the windings. It is particularly good since it gives an output when there is no error and no output when there is an error, thus making it basically self-checking.

While the invention has been particularly shown and described with reference to a preferred embodiment thereof, it will be understood by those skilled in the art that the foregoing and other changes in form and details may be made therein without departing from the spirit and the scope of the invention.

What is claimed is:

1. In a check circuit for determining the departure from a normal current relationship of a plurality of lines of which a predetermined number are disposed to carry currents having a predetermined normal relationship, a pair of cores of magnetic material each having a plurality of windings thereon, means connecting one group of a predetermined number of said lines to one winding on each core and another group of a predetermined number to a different winding on each core so as to normally provide an excess magnetomotive force for the winding of one group over the winding of the other group on one core and an excess magnetomotive force for the winding of the other group over the winding of said one group on the other core for said predetermined normal relationship, bias means connected to another winding on each core for neutralizing the excess magnetomotive force on each core for the predetermined normal current relation, and drive means connected to yet another of the windings on each core to provide a sufficient magnetomotive force for setting both the cores from only a substantially normal neutralized condition.

2. In a magnetic check device for a pair of drive lines disposed to carry drive currents with a predetermined current value relation, a pair of cores of magnetic material having a plurality of windings thereon including sense windings, AND circuit means connecting said sense windings to provide an output signal in response to simultaneous signals from the sense windings, means connecting one winding of each core in series with each drive line for applying a differential magnetomotive force to one core from one line and to the other core from the other line, bias means connected to yet another winding on each core for neutralizing said differential for each core, and drive means connected to still another of the windings of each core for providing a predetermined magnetomotive force for setting the cores only when they are neutralized.

3. In a check circuit for a pair of drive lines disposed to carry equal currents, a pair of cores of magnetic material each having a plurality of windings thereon, circuit means connecting each of said drive lines to one of said windings on each of said cores, said windings being oppositely disposed on each core and arranged so that one drive line provides a predetermined differential magnetomotive force on one core and the other drive line provides a similar differential on the other core, other circuit means connecting another winding on each core to a source of bias to neutralize said differential in each core for normal drive currents in said lines, and yet other circuit means connecting another one of said windings on each core to a drive source for producing a magnetomotive force sufficient to set only a substantially neutralized core.

4. In a check circuit for a pair of drive lines, a pair of cores of magnetic material each having a plurality of windings thereon, circuit means connecting one winding of each core to each line said windings being disposed to provide a difference magnetomotive force for one line on one core and for the other line on the other core, other circuit means connecting another winding of each core to a bias source to neutralize said differences, yet other circuit means connecting another winding on each core to a write driver for setting the cores in one direction, still other circuit means connecting yet another winding of each core to a read driver for setting it in the opposite direction, a sense winding on each core for producing an output when the core is set, and means responsive to simultaneous outputs from said sense windings to indicate a valid condition.

5. In a check circuit for a load sharing matrix switch wherein mganetic cores in a plurality of rows of switch cores are selectively switched in each row by selective combinations of a predetermined number of drivers out of a greater number, each having drive lines threading the cores in different arrangements, a pair of cores of magnetic material each having a plurality of windings thereon, circuit means connecting one predetermined number of said drive lines for each row to one of the windings on each core, other circuit means connecting another predetermined number of said lines to a second winding on each core, said windings being so arranged as to provide a predetermined difference magnetomotive force on one core from said one predetermined number, and a like difference force on the other core from said another predetermined number, gate means operable to complete a circuit for each of said predetermined number of lines, circuit means connecting one winding on each core to a bias source to neutralize said magnetomotive force differences, drive means operable in timed relation with the gate means to effect energization of yet another one of said windings on each core for switching it from a neutral state, and means connecting still another winding on each of said cores to provide a circuit responsive to simultaneous outputs when said cores are switched.

References Cited by the Examiner

UNITED STATES PATENTS

| | | | |
|---|---|---|---|
| 2,666,151 | 1/54 | Rajchman | 307—88 |
| 2,834,004 | 5/58 | Canepa | 307—88 |
| 2,846,667 | 8/58 | Goodell | 307—88 |
| 2,975,298 | 3/61 | Fawcett | 307—88 |
| 3,060,322 | 10/62 | Erickson et al. | 307—88 |

MALCOLM A. MORRISON, *Primary Examiner.*

STEPHEN W. CAPELLI, *Examiner.*